(12) United States Patent
Wen et al.

(10) Patent No.: US 11,105,678 B1
(45) Date of Patent: Aug. 31, 2021

(54) LIGHT SENSOR COMPRISING A HOLDER TO MOVE ALONG THE AXIS OF A FIXER TUBE TO ADJUST AN INCIDENT LIGHT ANGLE OF THE SENSOR COMPONENT AT THE BOTTOM TERMINAL OF THE TUBE

(71) Applicant: XIAMEN ECO LIGHTING CO. LTD., Xiamen (CN)

(72) Inventors: Xiaosong Wen, Xiamen (CN); Jianxin Xie, Xiamen (CN); Zhongyuan Liang, Xiamen (CN)

(73) Assignee: XIAMEN ECO LIGHTING CO. LTD., Fujian (CN)

( * ) Notice: Subject to any disclaimer, the term of this patent is extended or adjusted under 35 U.S.C. 154(b) by 0 days.

(21) Appl. No.: 16/821,801

(22) Filed: Mar. 17, 2020

(51) Int. Cl.
*G01S 7/48* (2006.01)
*G01J 1/06* (2006.01)
*G01J 1/04* (2006.01)
*G01J 1/42* (2006.01)

(52) U.S. Cl.
CPC ............... *G01J 1/06* (2013.01); *G01J 1/0403* (2013.01); *G01J 1/0411* (2013.01); *G01J 1/42* (2013.01)

(58) Field of Classification Search
CPC .. G02B 23/2484; G02B 27/0068; G02B 3/14; G02B 6/0066; G02B 7/023; G02B 7/09; H04N 5/2254; H04N 5/2257; H04N 2201/02431; G01J 1/0437; G01J 1/42; G01J 1/4204; G01J 1/44; G01J 3/0256; G03B 13/36; H01S 3/139; H01S 3/105; G01S 7/4817
USPC ....................... 250/203.4, 214 R, 239, 214.1
See application file for complete search history.

(56) References Cited

U.S. PATENT DOCUMENTS 8,450,603 B2 * 5/2013 Tadayon ............. H01L 31/0543
136/259

* cited by examiner

*Primary Examiner* — Que Tan Le
(74) *Attorney, Agent, or Firm* — Chun-Ming Shih; Lanway IPR Services (57) ABSTRACT

A light sensor includes a fixer tube, a sensor component, and holder. The sensor component is disposed at a bottom terminal of the fixer tube and fixed to the fixer tube. The sensor component senses incident lights. The holder is movably coupled to the fixer tube. The holder encompasses the sensor component. The holder further includes a first opening. The sensor component faces the first opening for receiving incident lights passing through the first opening. The holder further moves along an axis of the fixer tube for adjusting an incident light angle of the sensor component.

22 Claims, 8 Drawing Sheets

LIGHT SENSOR COMPRISING A HOLDER TO MOVE ALONG THE AXIS OF A FIXER TUBE TO ADJUST AN INCIDENT LIGHT ANGLE OF THE SENSOR COMPONENT AT THE BOTTOM TERMINAL OF THE TUBE

FIELD OF THE INVENTION

The present invention relates to a light sensor, and more particularly, to a light sensor capable of adjusting its incident light angle.

BACKGROUND OF THE INVENTION

A conventional light sensor, such as a passive infrared detection sensor, has a fixed range of detection angles, as long as the conventional light sensor is equipped with a lens dedicated for such fixed range. In other words, when such conventional light sensor requires a change of the detection range, it takes a physical replacement of its equipped lens. However, there are various types of lens with different detection ranges that the conventional light sensor can equip. If some of them are in shortage, the conventional light sensor may not be functional for specific range of detection angles. That is, flexibility of such conventional light sensor in its detection angle will be highly limited.

SUMMARY OF THE INVENTION

The present invention aims at disclosing a light sensor having an adjustable incident light angle. In this way, the lack of flexibility in detection angle of the conventional light sensor can be neutralized.

According to an embodiment, the present disclosure discloses a light sensor. The disclosed light sensor includes a fixer tube, a sensor component, and holder. The sensor component is disposed at a bottom terminal of the fixer tube and fixed to the fixer tube. The sensor component senses incident lights. The holder is movably coupled to the fixer tube. The holder encompasses the sensor component. The holder further includes a first opening. The sensor component faces the first opening for receiving incident lights passing through the first opening. The holder further moves along an axis of the fixer tube for adjusting an incident light angle of the sensor component.

In one example, the holder further moves along the axis of the fixer tube for adjusting a distance between the sensor component and the first opening. Also, the incident light angle of the sensor component is changed in response to the distance between the holder and the first opening.

In one example, the fixer tube and the sensor component form an integral structure.

In one example, the holder further includes an internal threaded groove. The holder extends from a bottom side of the holder to a top side of the holder. The fixer tube further includes an external tongue. The external tongue detachably engages with the internal threaded groove to form a groove-and-tongue fit in a relatively-movable manner.

In one example, the holder further moves along the axis of the fixer tube via a relative movement between the internal threaded groove and the external tongue for adjusting the incident light angle of the sensor component.

In one example, the holder further includes a plurality of stoppers. And the plurality of stoppers are disposed along the internal threaded groove. Also, the plurality of stoppers limit a relative movement between the internal threaded groove and the external tongue.

In one example, each of the plurality of stoppers deforms while being pushed by the external tongue during the relative movement between the internal threaded groove and the external tongue.

In one example, the fixer tube further includes an external threaded groove. Also, the fixer tube extends from a bottom side of the fixer tube to a top side of the fixer tube. In addition, the holder further includes an internal tongue. The internal tongue detachably engages with the external threaded groove to form a groove-and-tongue fit in a relatively-movable manner.

In one example, the holder further moves along the axis of the fixer tube via a relative movement between the internal threaded groove and the external tongue for adjusting the incident light angle of the sensor component.

In one example, the fixer tube further includes a plurality of stoppers. The plurality of stoppers are disposed along the external threaded groove. Also, the plurality of stoppers limit a relative movement between the internal threaded groove and the external tongue. In addition, each of the plurality of stoppers deforms while being pushed by the internal tongue during the relative movement between the internal threaded groove and the external tongue.

In one example, the holder further movably and detachably engages with the fixer tube to form a snap fit, an interference fit, a post-and-bore fit, or a press fit. In one example, the light sensor further includes an engaging structure. The engaging structure detachably engages the fixer tube with the holder.

In one example, the engaging structure includes a plurality of convex structures and a plurality of concave structures. Also, the plurality of convex structures are coupled to the fixer tube and disposed along an axial direction of the fixer tube. The plurality of concave structures are coupled to the holder and disposed along an axial direction of the holder. At least one of the plurality of convex structures selectively and detachably engages with at least one of the concave structures for adjusting a relative position between the holder and the sensor component and in turn adjusting the incident light angle of the sensor component.

In one example, the light sensor further includes an encompassing body. The encompassing body affixes and encompasses the sensor component.

In one example, the encompassing body includes a second opening. The sensor component further protrudes outside the second opening.

In one example, the encompassing body further encompasses the fixer tube. The holder is further disposed between the encompassing body and the fixer tube. In one example, a gap is formed between the encompassing body and the fixer tube for allowing an axial movement of the holder.

In one example, the holder further includes a circumferential projection. The circumferential projection is disposed at a bottom side of the encompassing body for abutting the encompassing body and a top side of the holder.

In one example, the encompassing body further encompasses the fixer tube. Also, the holder is further movably disposed at an external side of the encompassing body. And the holder further moves along an axis of the encompassing body.

In one example, the encompassing body further includes a plurality of scale lines at an external surface of the encompassing body. In addition, the holder further aligns with one of the plurality of scale lines as a basis of adjusting the incident angle of the sensor component.

In one example, the sensor component includes a lens and a light transmitter. Also, the light transmitter is disposed at a light exit terminal of the lens.

In one example, the fixer tube further includes a plurality of scale lines disposed at an external surface of the fixer tube. The holder further aligns with one of the plurality of scale lines as a basis of adjusting the incident angle of the sensor component.

In one example, the sensor component further includes a plurality of scale lines disposed at an external surface of the sensor component. Also, the holder further aligns with one of the plurality of scale lines as a basis of adjusting the incident angle of the sensor component.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3-FIG. 5 illustrate different incident angles that the light sensor shown in FIG. 1-FIG. 2 is capable of providing.

DETAILED DESCRIPTION

As mentioned above, the present invention discloses a light sensor capable of adjusting its incident light angle. In this way, the light sensor is substantially free from the burden of physically changing its lens for different detection angles.

Figure 1:
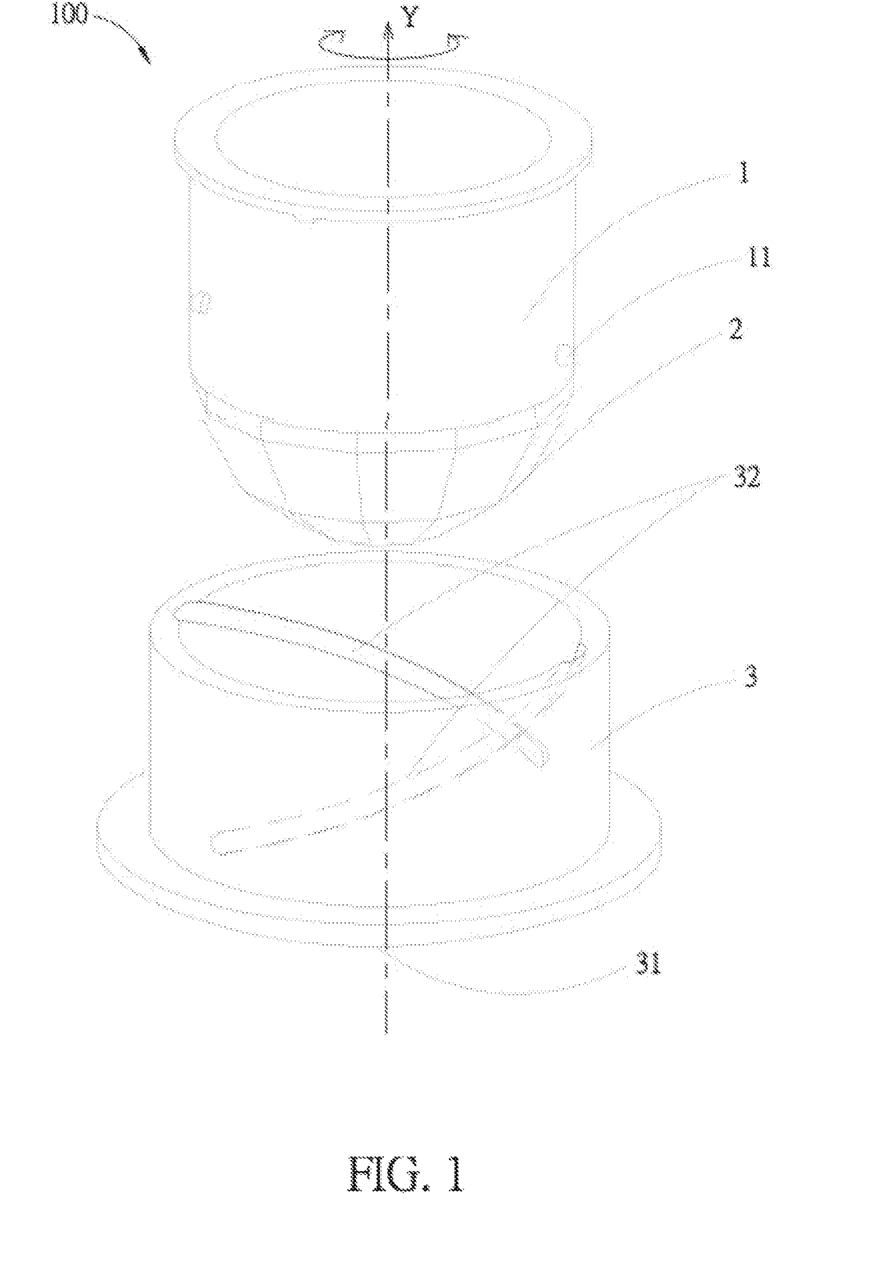
FIG. 1 illustrates a diagram of a light sensor according to a first embodiment.
Figure 2:
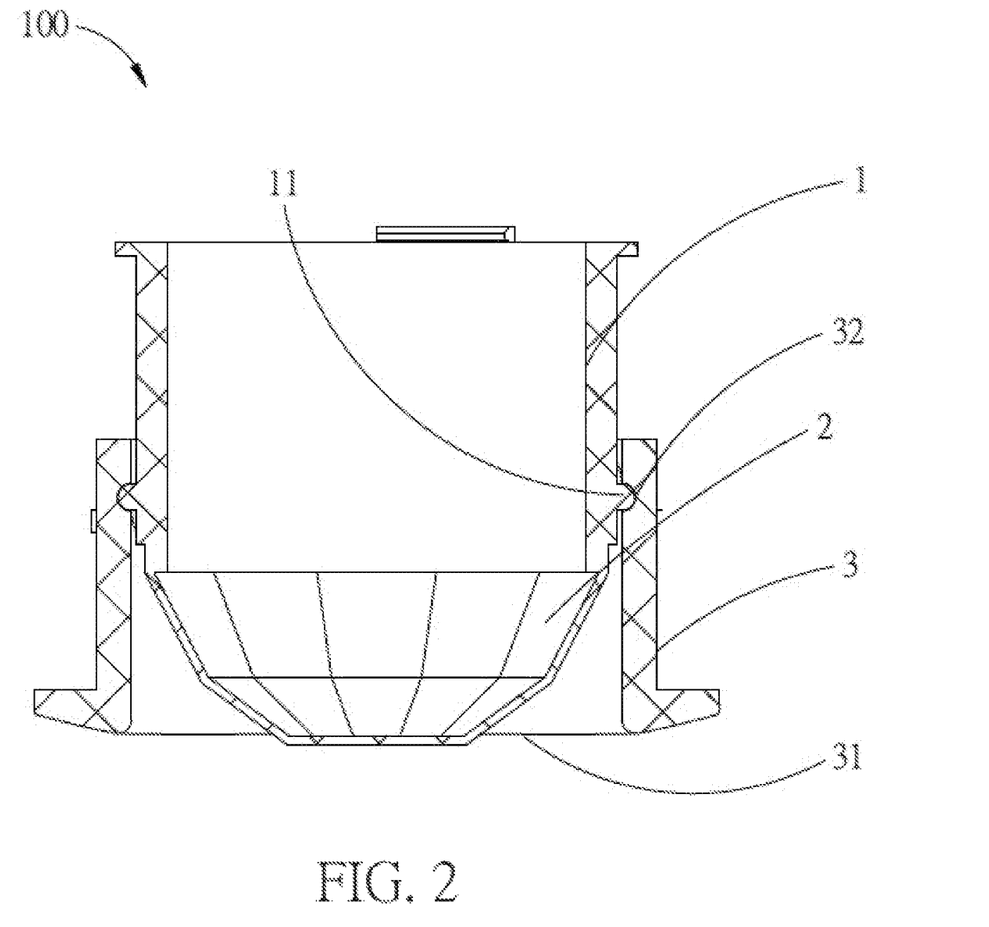
FIG. 2 illustrates a lateral sectional diagram of the light sensor shown in FIG. 1.
Figure 3:
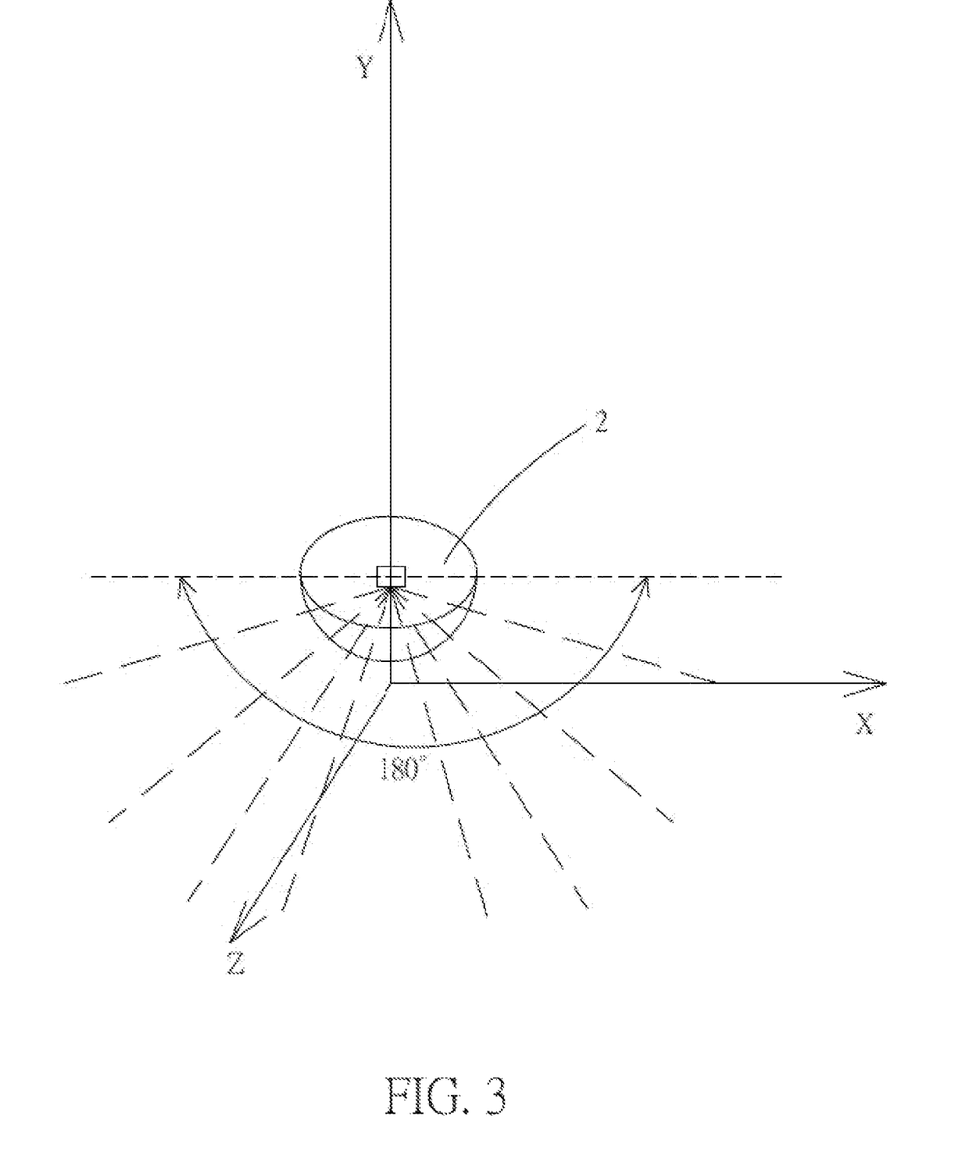
Figure 4:
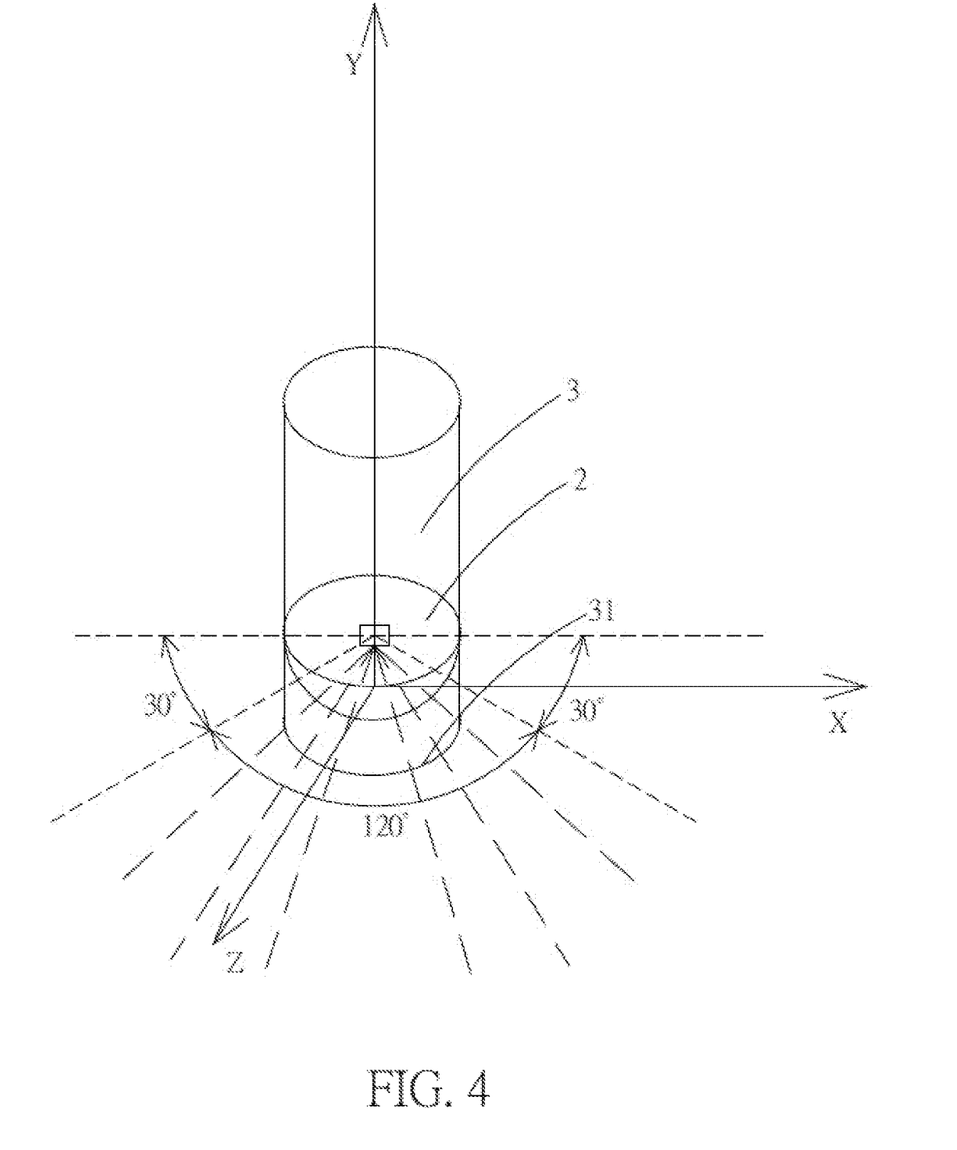
Figure 5:
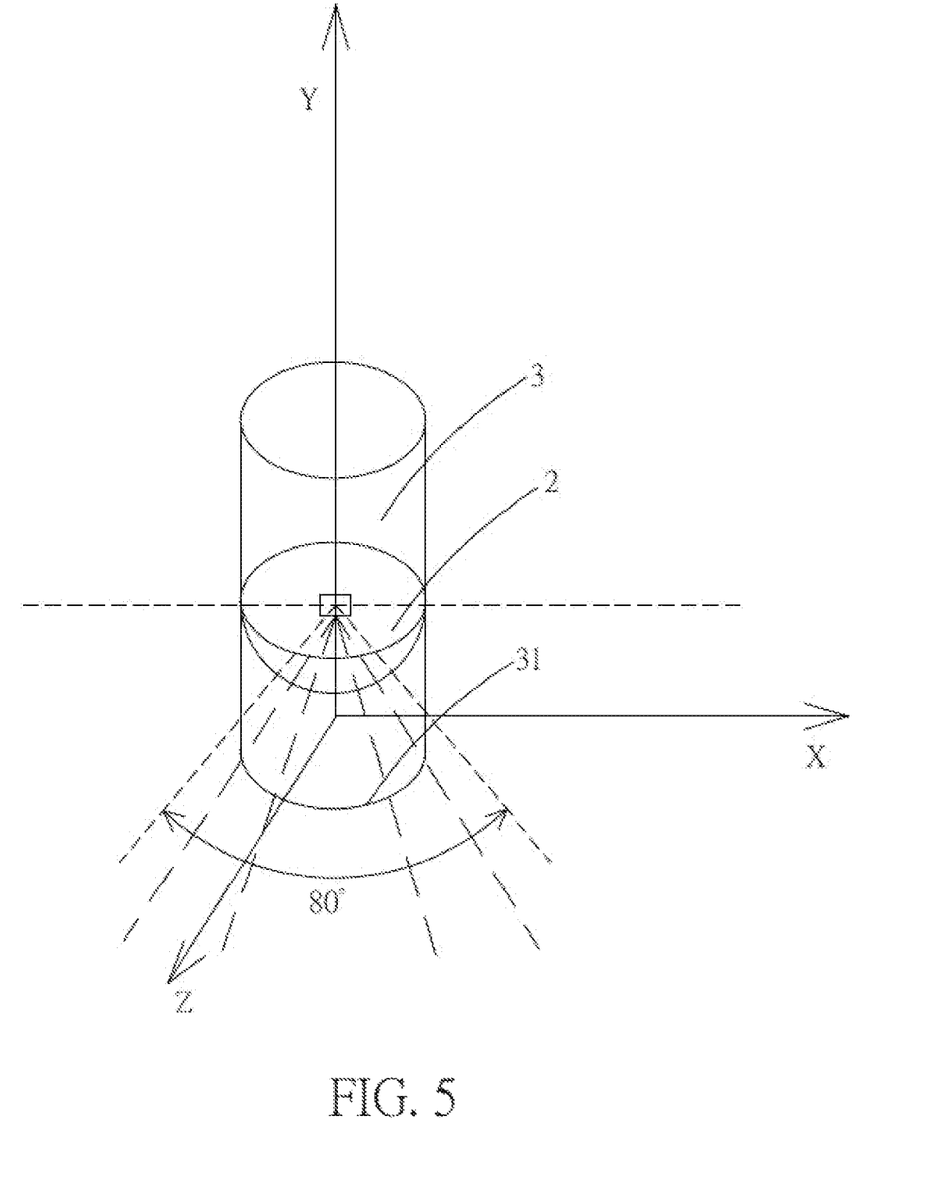
Figure 6:
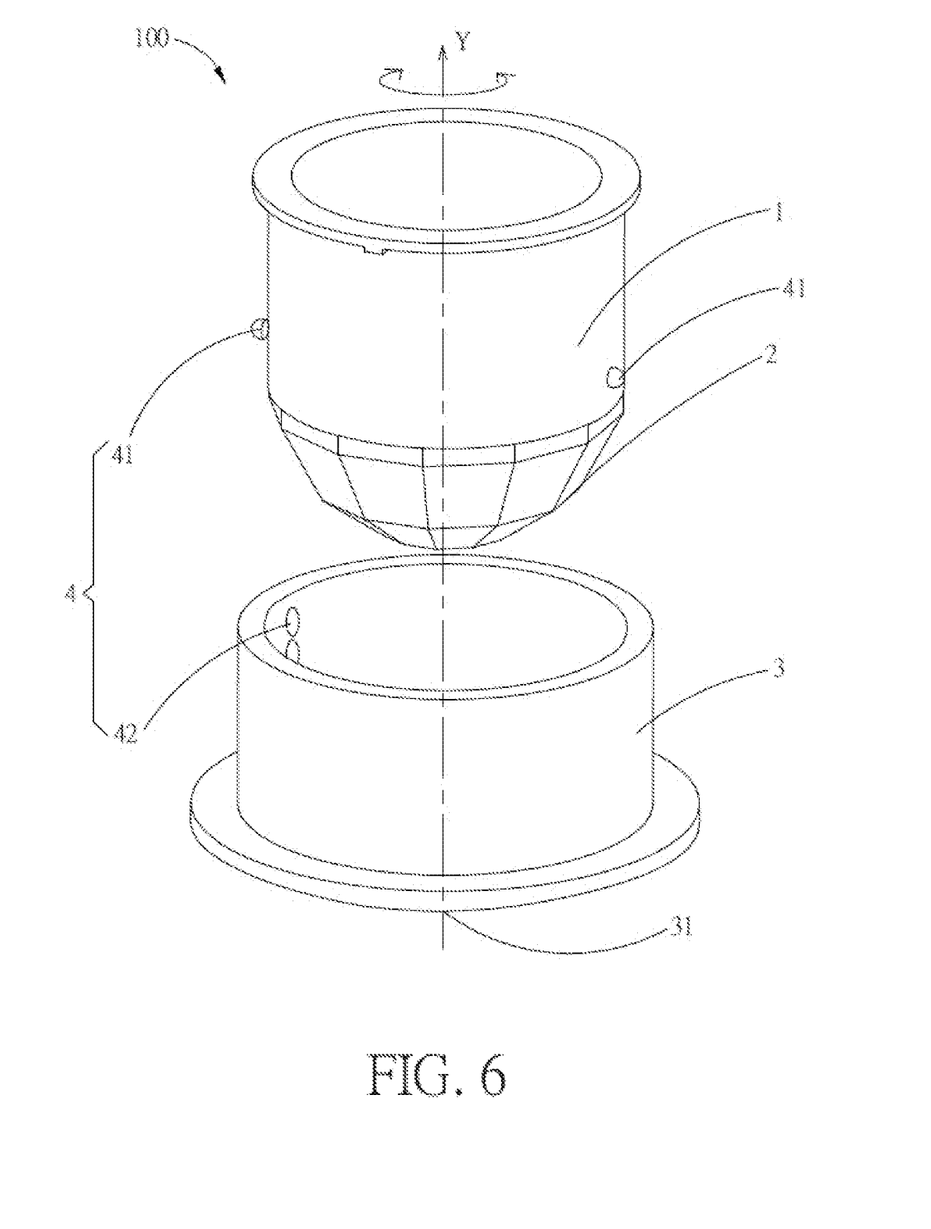
FIG. 6 illustrates the light sensor that incorporates an engaging structure according to a second embodiment.
Figure 7:
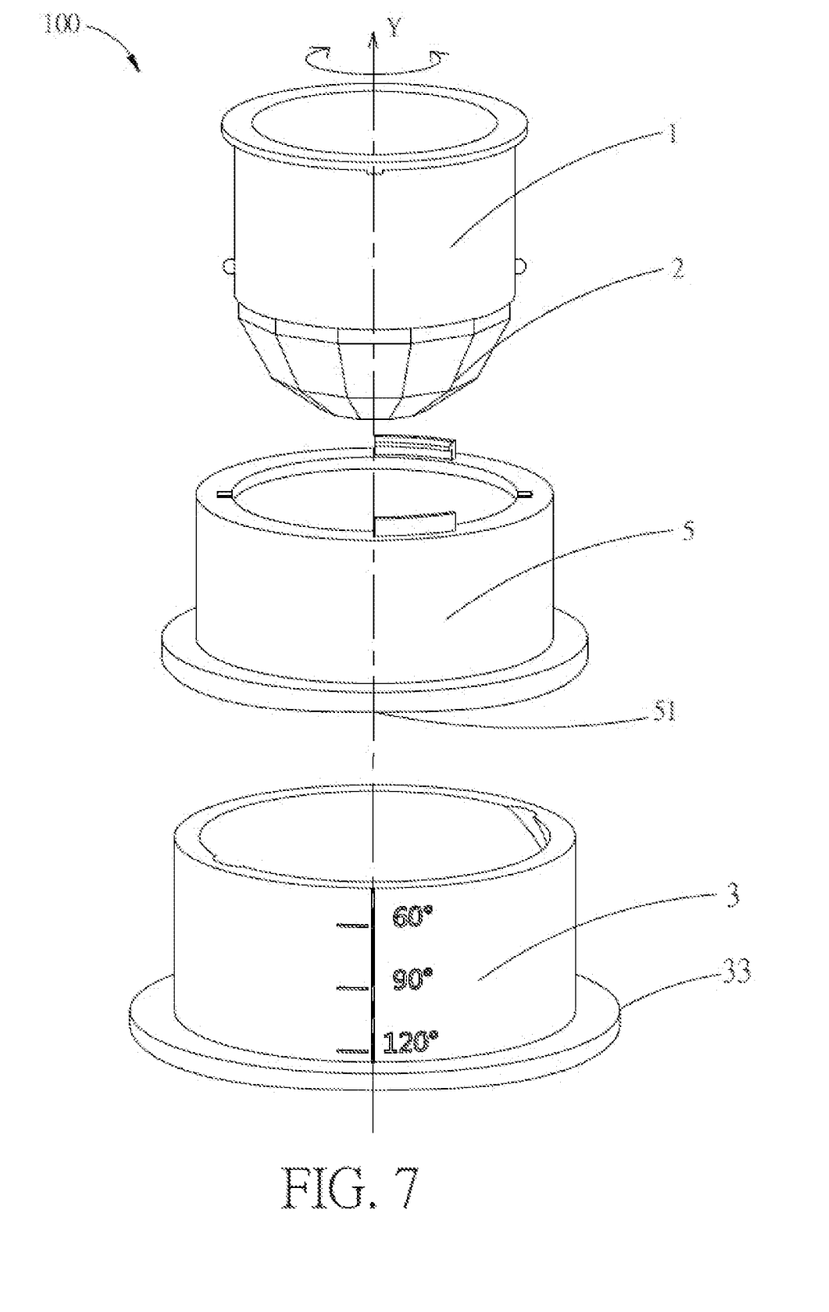
FIG. 7 illustrates the light sensor that includes a circumferential projection according to a third embodiment.
Figure 8:
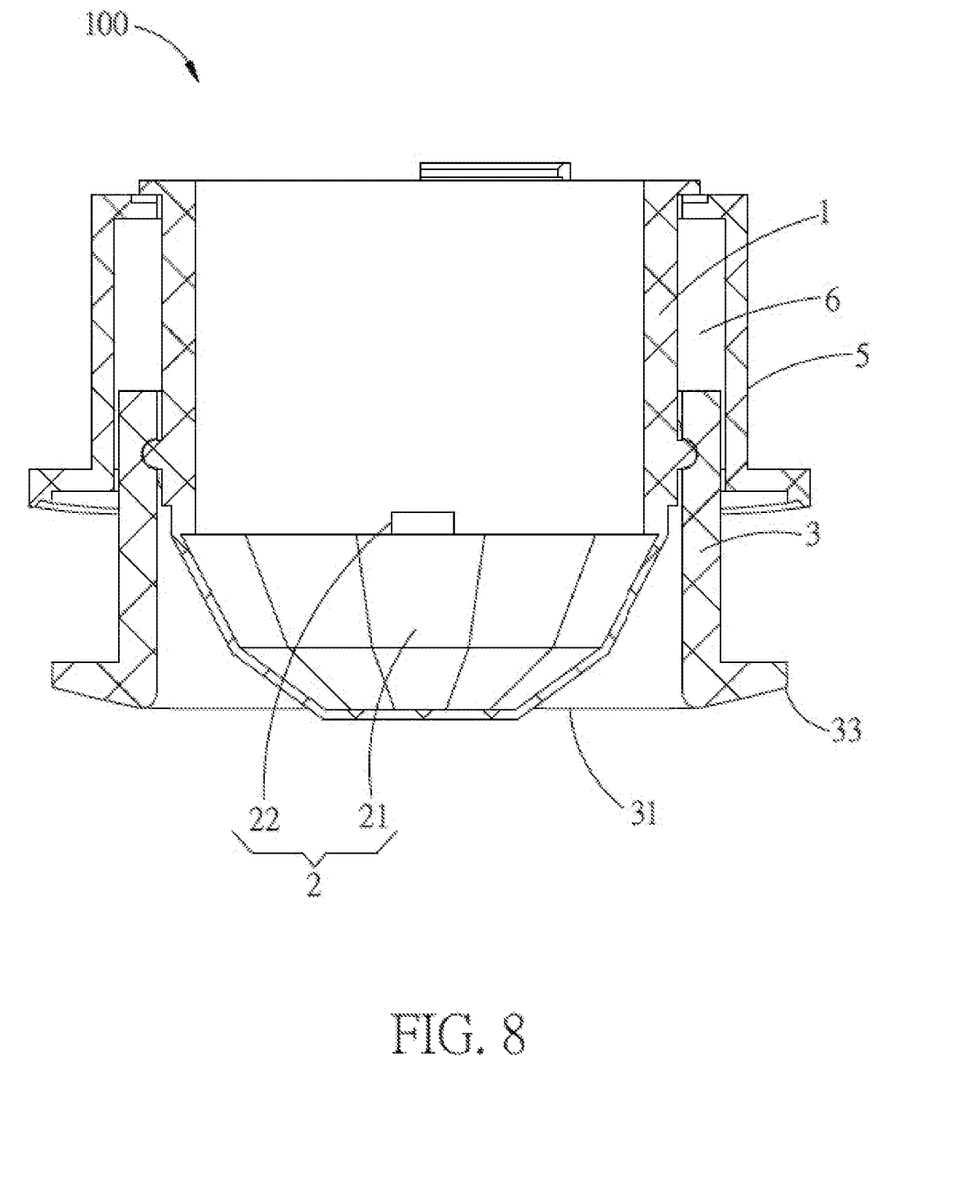
FIG. 8 illustrates a lateral sectional diagram of the light sensor shown in FIG. 7.

FIG. 1-FIG. 8 illustrates a light sensor 100 capable of adjusting its incident angle according to one embodiment. FIG. 1 illustrates a diagram of the light sensor 100 according to a first embodiment. FIG. 2 illustrates a lateral sectional diagram of the light sensor 100 shown in FIG. 1. FIG. 3-FIG. 5 illustrate different incident angles that the light sensor 100 is capable of providing. FIG. 6 illustrates the light sensor 100 that incorporates an engaging structure according to a second embodiment. FIG. 7 illustrates the light sensor 100 that includes a circumferential projection according to a third embodiment. FIG. 8 illustrates a lateral sectional diagram of the light sensor 100 shown in FIG. 7.

As shown in FIG. 1, the light sensor 100 includes a fixer tube 1, a sensor component 2 and a holder 3. The sensor component 2 is disposed at a bottom terminal of the fixer tube 1. Also, the sensor component 2 is fixed to the fixer tube 1. The sensor component 2's function is to sense incident lights reflected from detected objects, which may be located in the light sensor 100's proximity or within its substantially detectable range. Such that the light sensor 100 can sense the detected objects. The holder 3 is movably coupled to the fixer tube 1. In addition, the holder 3 encompasses the sensor component 2. The holder 3 further includes a first opening 31. The sensor component 2 faces the first opening 31. In this way, the sensor component 2 receives incident lights passing through the first opening 31 for object detection.

Moreover, the holder 3 moves along an axis Y of the fixer tube 1. By different locations where the holder 3 moves to, an incident light angle of the sensor component 2 can be adjusted accordingly.

More specifically, in one example, the incident angle of the sensor component 2 is adjusted via a distance between the first opening 31 and the sensor component 2. And the distance between the first opening 31 and the sensor component 2 can be adjusted via the different locations where the holder 3 moves along the axis Y of the fixer tube 1. In this way, the incident angle of the sensor component 2 can be adjusted by moving the holder 3 along the axis Y of the fixer tube 1.

In one example, the fixer tube 1 and the sensor component 2 form an integral structure for preventing the sensor component 2 from dislocating from the fixer tube 1 while moving the holder 3 along the axis Y.

FIG. 3-FIG. 5 further illustrate some examples of different incident angles of the sensor component 2.

As shown in FIG. 3, if the holder 3 does not encompass (i.e., not block) the sensor component 2, the incident angle of the sensor component 2 reaches 180 degrees. In this way, the sensor component 2 reaches its maximal detection range.

As shown in FIG. 4, when the holder 3 encompasses the sensor component 2, since a portion of incident lights are blocked by the holder 3, a range of the sensor component 2's incident light angle is changed correspondingly. For example, as shown in FIG. 4, the sensor component 2's incident light angle is limited to a range of 120 degrees.

As shown in FIG. 5, the holder 3 moves away from the first opening 31 along the axis Y in comparison to the condition shown in FIG. 4. Correspondingly, the sensor component 2's incident light angle shrinks to, for example, a range of 80 degrees. In other words, in some examples, a shorter distance between the first opening 31 and the sensor component 2 indicates a larger range of the sensor component 2's incident light angle. And a larger distance between the first opening 31 and the sensor component 2 indicates a smaller range of the sensor component 2's incident light angle.

With the aid of the abovementioned light sensor 100, adjustment of the sensor component 2's incident light angle is free from physical changes of utilized lens. In this way, the lack of flexibility in the incident light angle's change of the conventional light sensor is substantially neutralized.

In some examples, as shown in FIG. 1 and FIG. 2, the holder 3 further includes an internal threaded groove 32. And the fixer tube 1 further includes an external tongue 11. The internal threaded groove 32 extends from a bottom side of the holder 3 to a top side of the holder 3. Also, the external tongue 11 detachably engages with the internal threaded groove 32. As a result, the internal threaded groove 32 and the external tongue 11 form a groove-and-tongue fit with each other. In addition, the internal threaded groove 32 and the external tongue 11 engage in a relatively-movable manner. Such that the holder 3 can be rotated along the groove-and-tongue fit to move along the fixer tube 1's axis Y. And the sensor component 2's incident light angle can be adjusted accordingly.

In some examples, the holder 3 includes several stoppers (not shown for brevity). The stoppers are disposed along the trail of the internal threaded groove 32. Therefore, when the holder 3 rotates along the axis Y, the external tongue 11 may be substantially pushed by the stoppers. Also, the stoppers may be deformed while the external tongue 11 is selectively pushed across the stoppers. In this way, the relative movement between the internal threaded groove 32 and the external tongue 11 can be selectively limited for temporarily fixing different incident light angles of the sensor component 2.

In some examples, there are two internal threaded grooves 32 on the holder 3 and two corresponding external tongues 11 on the fixer tube 1. That is, the two internal threaded grooves 32 and the two corresponding external tongues 11 form two pairs of incident light angle adjusting mechanisms for the light sensor 1.

In some other examples, the holder 3 may include an internal tongue. And the fixer tube 1 may include an external threaded groove. That is, switching the internal threaded groove 32 and the external tongue 11 shown in FIG. 1. The interaction and functionality between the internal tongue on the holder 3 and the external threaded groove on the fixer tube 1 are similar as those descriptions related to the internal threaded groove 32 and the external tongue 11. Such that repeated descriptions are skipped for brevity. Also, there may also be stoppers disposed within the external threaded groove for performing similar functions as those disposed within the internal threaded groove 32. In some examples, there may also be two internal tongues on the holder 3 and two external threaded grooves on the fixer tube 1 to form two pairs of incident light angel adjusting mechanisms of the light sensors 100. In some examples, the holder 3 movably and detachably engages with the fixer tube 1 to form a snap fit, an interference fit, a post-and-bore fit, or a press fit, for the purpose of adjusting the sensor component 2's incident light angle.

As shown in FIG. 6, in some examples, the light sensor 100 includes an engaging structure 4. The engaging structure 4 detachably engages the fixer tube 1 with the holder 3. In some examples, the engaging structure 4 includes multiple convex structures 41 and multiple concave structures 42.

Optionally, the convex structures 41 are coupled to the fixer tube 1. Also, the convex structures 41 are disposed along the axis Y of the fixer tube 1. In addition, the concave structures 42 are coupled to the holder 3. Moreover, the concave structures 42 are disposed along an axial direction of the holder 3, which substantially meets the axis Y of the fixer tube 1 while the holder 3 encompasses the fixer tube 1. While adjusting the sensor component 2's incident light angle, at least one of the convex structures 41 selectively and detachably engages with at least one of the concave structures 42. In this way, the engagement between the at least one selected convex structure 41 and the at least one selected concave structure 42 fixes a relative position between the holder 3 and the sensor component 2 for adjustment. In turn, the sensor component 2's incident light angle is adjusted and fixed along with the fixed relative position between the holder 3 and the sensor component 2.

In some examples, the convex structures 41 can be switched on the holder 3, and the concave structures 42 can be switched on the fixer tube 1 for performing similar functions and interactions. Such that repeated descriptions are skipped for brevity.

As shown in FIG. 7 and FIG. 8, the light sensor 100 may include an encompassing body 5. The encompassing body 5 affixes and encompasses the sensor component 2.

In some examples, the encompassing body 5 includes a second opening 51. Also, the sensor component 2 protrudes outside the second opening 51. In this way, the encompassing body 5 protects the sensor component 2 from being damaged by an undesired external force.

Optionally, the encompassing body 5 encompasses the fixer tube 1. Also, the holder 3 is disposed between the encompassing body 5 and the fixer tube 1. Such that the encompassing body 5 protects both the fixer tube 1 and the holder 3. In this way, a gap 6 is formed between the encompassing body 5 and the fixer tube 1. The gap 6 allows the holder 3 to move along the fixer tube 1's axis Y for adjusting the sensor component 2's incident light angle. The encompassing body 5 may also be designed in a way that a human being can easily hold. Such that the human being can easily move the holder 3 by exerting a corresponding force on the encompassing body 5.

In some examples, the holder 3 also includes a circumferential projection 33. The circumferential projection 33 is disposed at a bottom side of the encompassing body 5. Such that the circumferential projection 33 abuts the encompassing body 5 and a top side of the holder 3. As a result, the circumferential projection 33 stops the holder 3 from being substantially over-encompassed by the encompassing body 5, or a human being may not be able to move, rotate or even detach the holder 3.

In some examples, the encompassing body 5 encompasses the fixer tube 1. And the holder 3 is further movably disposed at an external side of the encompassing body 5. Similarly, under such condition, the holder 3 moves relatively to the encompassing body 5 along an axis of the encompassing body 5. Such that the sensor component 2's incident light angle is adjusted accordingly. At this time, the encompassing body 5's axis substantially meets the fixer tube 1's axis Y.

In some examples, the sensor component 2 includes a lens 21 and a light transmitter 22. The light transmitter 22 is disposed at a light exit terminal of the lens 21 for directing the received incident lights.

In some examples, the light sensor 100 may include scale lines for serving as a basis to fine-tune the distance between the first opening 31 and the sensor component 2. In some examples, the scale lines may be disposed at an external surface of the encompassing body 5, an external surface of the fixer tube 1, or an external surface of the sensor component 2.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light sensor, comprising:
   a fixer tube;
   a sensor component, disposed at a bottom terminal of the fixer tube and fixed to the fixer tube, wherein the sensor component is configured to sense incident lights; and
   a holder, movably coupled to the fixer tube, wherein the holder is configured to encompass the sensor component, and wherein the holder further comprises a first opening;
   wherein the sensor component is configured to face the first opening for receiving incident lights passing through the first opening; and
   wherein the holder is further configured to move along an axis of the fixer tube for adjusting an incident light angle of the sensor component.

2. The light sensor of claim 1, wherein the holder is further configured to move along the axis of the fixer tube for adjusting a distance between the sensor component and the first opening, wherein the incident light angle of the sensor component is changed in response to the distance between the holder and the first opening.

3. The light sensor of claim 1, wherein the fixer tube and the sensor component are configured to form an integral structure.

4. The light sensor of claim 1, wherein the holder further comprises:
an internal threaded groove, configured to extend from a bottom side of the holder to a top side of the holder;
wherein the fixer tube further comprises:
an external tongue configured to detachably engage with the internal threaded groove to form a groove-and-tongue fit in a relatively-movable manner.

5. The light sensor of claim 4, wherein the holder is further configured to move along the axis of the fixer tube via a relative movement between the internal threaded groove and the external tongue for adjusting the incident light angle of the sensor component.

6. The light sensor of claim 4, wherein the holder further comprises:
a plurality of stoppers, disposed along the internal threaded groove, and configured to limit a relative movement between the internal threaded groove and the external tongue;
wherein each of the plurality of stoppers is configured to deform while being pushed by the external tongue during the relative movement between the internal threaded groove and the external tongue.

7. The light sensor of claim 1, wherein the fixer tube further comprises:
an external threaded groove, configured to extend from a bottom side of the fixer tube to a top side of the fixer tube;
wherein the holder further comprises:
an internal tongue configured to detachably engage with the external threaded groove to form a groove-and-tongue fit in a relatively-movable manner.

8. The light sensor of claim 7, wherein the holder is further configured to move along the axis of the fixer tube via a relative movement between the internal threaded groove and the external tongue for adjusting the incident light angle of the sensor component.

9. The light sensor of claim 7, wherein the fixer tube further comprises:
a plurality of stoppers, disposed along the external threaded groove, and configured to limit a relative movement between the internal threaded groove and the external tongue;
wherein each of the plurality of stoppers is configured to deform while being pushed by the internal tongue during the relative movement between the internal threaded groove and the external tongue.

10. The light sensor of claim 1, wherein the holder is further configured to movably and detachably engage with the fixer tube to form a snap fit, an interference fit, a post-and-bore fit, or a press fit.

11. The light sensor of claim 1, further comprising:
an engaging structure configured to detachably engage the fixer tube with the holder.

12. The light sensor of claim 11, wherein the engaging structure comprises:
a plurality of convex structures, coupled to the fixer tube and disposed along an axial direction of the fixer tube; and
a plurality of concave structures, coupled to the holder and disposed along an axial direction of the holder;
wherein at least one of the plurality of convex structures is configured to selectively and detachably engage with at least one of the concave structures for adjusting a relative position between the holder and the sensor component and in turn adjusting the incident light angle of the sensor component.

13. The light sensor of claim 1, further comprising:
an encompassing body configured to affix and encompass the sensor component.

14. The light sensor of claim 13, wherein the encompassing body comprises a second opening, wherein the sensor component is further configured to protrude outside the second opening.

15. The light sensor of claim 13, wherein the encompassing body is further configured to encompass the fixer tube; and
wherein the holder is further disposed between the encompassing body and the fixer tube.

16. The light sensor of claim 13, wherein a gap is formed between the encompassing body and the fixer tube for allowing an axial movement of the holder.

17. The light sensor of claim 13, wherein the holder further comprises:
a circumferential projection disposed at a bottom side of the encompassing body for abutting the encompassing body and a top side of the holder.

18. The light sensor of claim 13, wherein the encompassing body is further configured to encompass the fixer tube;
wherein the holder is further movably disposed at an external side of the encompassing body; and
wherein the holder is further configured to move along an axis of the encompassing body.

19. The light sensor of claim 13, wherein the encompassing body further comprises a plurality of scale lines at an external surface of the encompassing body;
wherein the holder is further configured to align with one of the plurality of scale lines as a basis of adjusting the incident angle of the sensor component.

20. The light sensor of claim 1, wherein the sensor component comprises:
a lens; and
a light transmitter disposed at a light exit terminal of the lens.

21. The light sensor of claim 1, wherein the fixer tube further comprises a plurality of scale lines disposed at an external surface of the fixer tube;
wherein the holder is further configured to align with one of the plurality of scale lines as a basis of adjusting the incident angle of the sensor component.

22. The light sensor of claim 1, wherein the sensor component further comprises a plurality of scale lines disposed at an external surface of the sensor component;
wherein the holder is further configured to align with one of the plurality of scale lines as a basis of adjusting the incident angle of the sensor component.

* * * * *